(12) United States Patent
Sporre et al.

(10) Patent No.: US 7,338,544 B2
(45) Date of Patent: Mar. 4, 2008

(54) Z-FILTER MEDIA WITH REVERSE-FLOW CLEANING SYSTEMS AND METHODS

(75) Inventors: Timothy D. Sporre, Robbinsdale, MN (US); Jim C. Rothman, Burnsville, MN (US); Michael W. Handley, Farmington, MN (US); Thomas D. Raether, St. Louis Park, MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 11/331,392

(22) Filed: Jan. 12, 2006

(65) Prior Publication Data

US 2006/0112667 A1 Jun. 1, 2006

Related U.S. Application Data

(63) Continuation of application No. 10/731,564, filed on Dec. 8, 2003.

(60) Provisional application No. 60/432,923, filed on Dec. 11, 2002.

(51) Int. Cl.
  *B01D 46/12* (2006.01)
  *B01D 46/52* (2006.01)

(52) U.S. Cl. ............... 55/302; 55/283; 55/303; 55/341.1; 55/498; 55/529; 95/280; 95/286; 95/287

(58) Field of Classification Search ............. 55/302, 55/303, 283, 341.1, 498, 529; 95/280, 286, 95/287
  See application file for complete search history.

(56) References Cited

U.S. PATENT DOCUMENTS

| | | |
|---|---|---|
| 3,676,242 A | 7/1972 | Prentice |
| 3,841,953 A | 10/1974 | Lohkamp et al. |
| 3,849,241 A | 11/1974 | Butin et al. |
| 3,878,014 A | 4/1975 | Melead |
| 4,218,227 A | 8/1980 | Frey |
| 4,331,459 A | 5/1982 | Copley |
| 4,364,751 A | 12/1982 | Copley |
| 4,904,282 A | 2/1990 | Stuble et al. |
| 5,178,652 A * | 1/1993 | Huttlin ........................ 95/279 |
| 5,423,829 A | 6/1995 | Pham et al. |
| 5,575,826 A | 11/1996 | Gillingham et al. |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A * | 10/1998 | Gillingham et al. .......... 55/488 |
| 5,827,338 A | 10/1998 | Horvat |
| 5,895,574 A | 4/1999 | Friedmann et al. |
| 5,902,364 A | 5/1999 | Tokar et al. |
| 5,964,909 A | 10/1999 | Brunner |

(Continued)

FOREIGN PATENT DOCUMENTS

| | | |
|---|---|---|
| WO | WO 97/40918 | 11/1997 |
| WO | WO 03/047722 | 6/2003 |
| WO | WO 2004/000704 | 1/2004 |

*Primary Examiner*—Duane Smith
*Assistant Examiner*—Minh-Chau T. Pham
(74) *Attorney, Agent, or Firm*—Merchant & Gould P.C.

(57) ABSTRACT

A method for cleaning a filter having Z-media includes providing a filter having Z-media and cleaning the media construction by directing a pulse of compressed gas into the media construction through the downstream flow face. Filter elements useable with such methods include elements made of Z-media. An example system utilizing the method includes a gas turbine air intake system.

15 Claims, 14 Drawing Sheets

U.S. PATENT DOCUMENTS

| | | |
|---|---|---|
| 5,980,598 A | 11/1999 | Horvat |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,296 B1 | 2/2002 | Warner |
| 6,613,115 B2 * | 9/2003 | Moore ............... 55/302 |
| 6,673,136 B2 | 1/2004 | Gillingham et al. |
| 6,743,273 B2 | 6/2004 | Chung et al. |
| 6,749,665 B2 * | 6/2004 | Bjarnø et al. ............ 95/20 |
| 2004/0187689 A1 * | 9/2004 | Sporre et al. ........... 95/280 |
| 2004/0226443 A1 | 11/2004 | Gillingham et al. |
| 2005/0120881 A1 * | 6/2005 | Sporre et al. ........... 95/280 |

\* cited by examiner

US 7,338,544 B2

Z-FILTER MEDIA WITH REVERSE-FLOW CLEANING SYSTEMS AND METHODS

CROSS-REFERENCE TO RELATED APPLICATIONS

This application is a continuation of application Ser. No. 10/731,564, filed Dec. 8, 2003; application Ser. No. 10/731,564 claims priority to U.S. Provisional Application No. 60/432,923, filed Dec. 11, 2002. Each of application Ser. Nos. 10/731,564 and 60/432,923 is incorporated herein by reference.

This application is related to a U.S. utility patent application entitled REVERSE-FLOW CLEANING SYSTEMS AND METHODS, having U.S. Ser. No. 10/731,556, which application is being filed concurrently herewith and incorporated herein by reference.

TECHNICAL FIELD

This disclosure relates to Z-filter media, filter elements, systems, and methods. In particular, this disclosure relates to Z-filter media, filter elements, systems, and methods with reverse-flow cleaning, such as pulse cleaning. In certain examples described, this disclosure relates to filtering of gas useful with gas turbine systems.

BACKGROUND

Filters are used to purify a variety of fluids, including gas and liquid. The filter media used for the purification, over time, will load with contaminant. Filters are used until they are plugged (contaminant blocks all flow through the media) or until a predetermined restriction level is reached. Both are associated with flow and the work necessary to move the flow. Either too little fluid is allowed to flow through, or too much work is required to move the desired flow due to the higher restriction.

In some systems, pulse jet cleaning is used to periodically remove contaminant from the upstream side of the filter media. Using pulse-cleaning increases the life of the filter by decreasing the restriction and increasing the service interval. Pulse-cleaning has been used with pleated filters in arrangements described in U.S. Pat. Nos. 4,364,751; 4,218,227; 4,331,459; and 5,575,826, each of which is incorporated by reference herein.

SUMMARY OF THE DISCLOSURE

A method for cleaning a filter having Z-media is provided. The method includes providing a filter having Z-media and cleaning the media construction by directing a flow of pressurized fluid into the media construction through the downstream flow face.

Filter elements useable with such methods are described.

An example system utilizing the method is described, with respect to a gas turbine air intake system.

DETAILED DESCRIPTION

Figure 1:
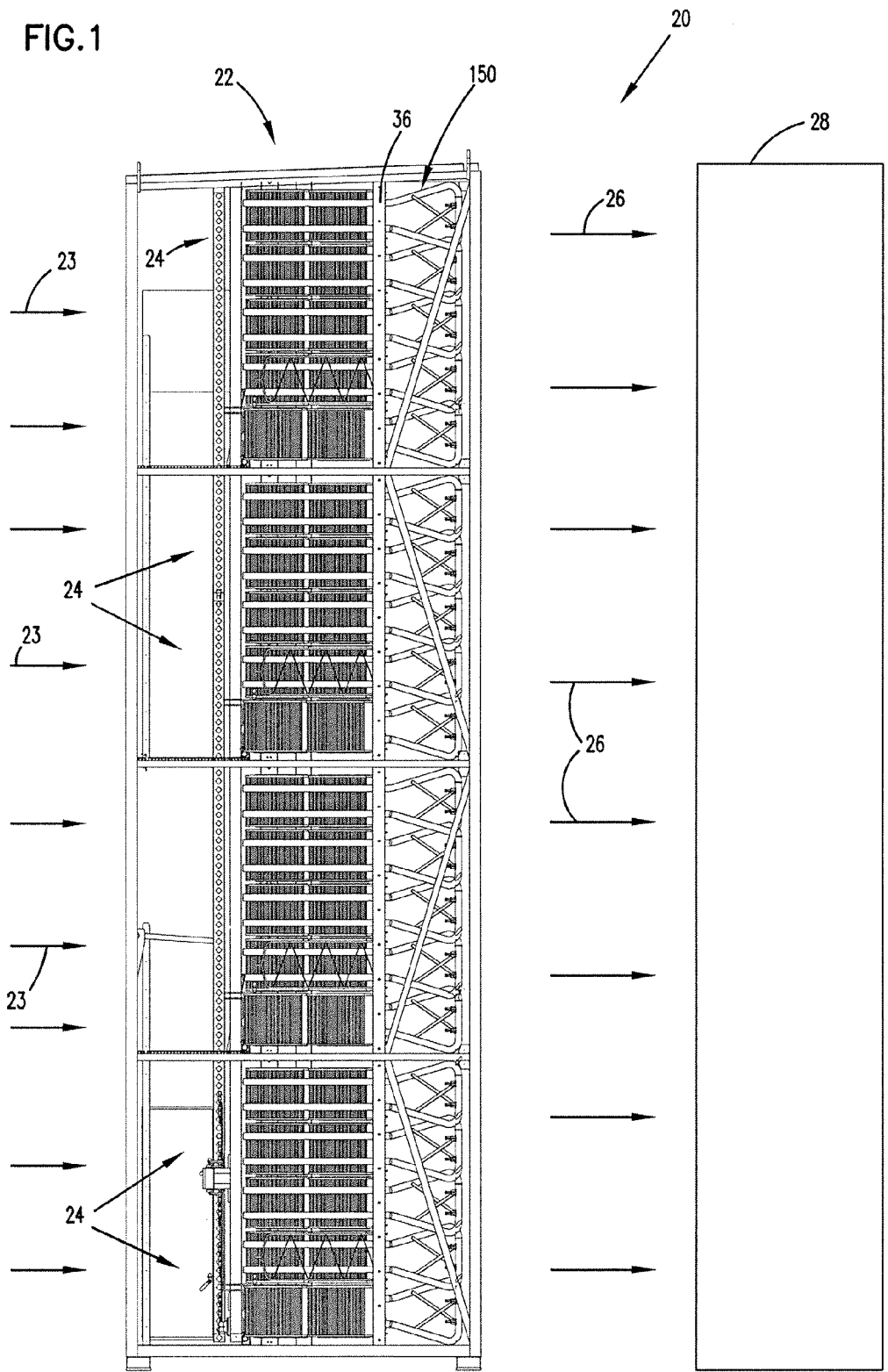
FIG. 1 is a schematic view of one embodiment of a portion of a gas intake system for a gas turbine system having filter arrangements and utilizing methods in accordance with principles disclosed herein.
Figure 2:
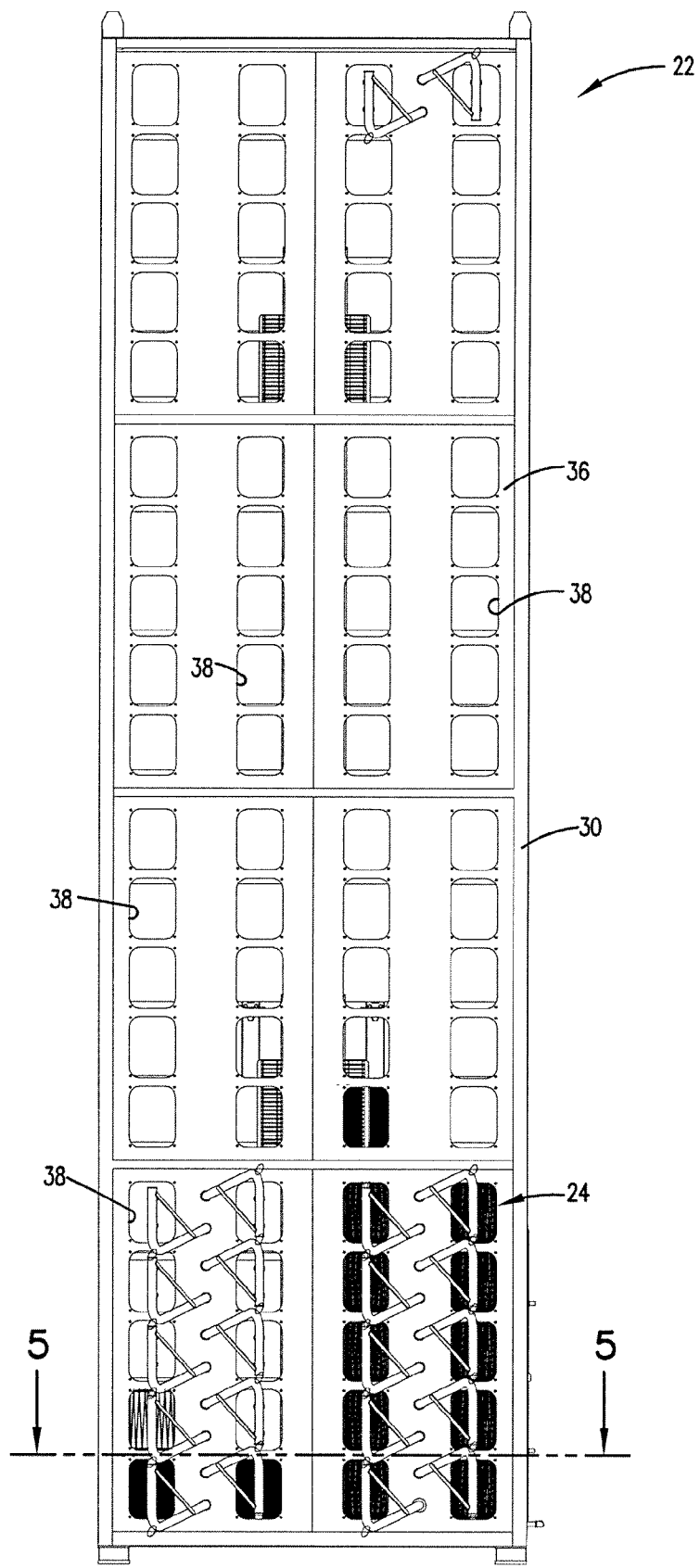
FIG. 2 is a schematic, front elevational view of the gas intake system shown in FIG. 1, with only portions of the system being shown.

A. FIGS. 1 and 2, System of Use

The methods of use, gas cleaner arrangements, and constructions disclosed herein are useable with a variety of systems. FIGS. 1 and 2 depict one example system. In this case, the example system shown is a gas turbine system. The gas turbine system is shown in FIG. 1 schematically at 20.

In FIG. 1, gas, such as air, is shown drawn into an air intake system 22 at arrows 23. The air intake system 22 includes a plurality of gas filter arrangements 24 generally held in a tube sheet 36.

The air is cleaned in the gas filter arrangements 24, and then it flows downstream at arrows 26 into gas turbine generator 28, where it is used to generate power.

It should be understood that in FIG. 2, only a portion of the air intake system 22 is depicted. This is for purposes of clarity and explanation.

B. Overview of Gas Filter Arrangement, System, and Method

Figure 3:
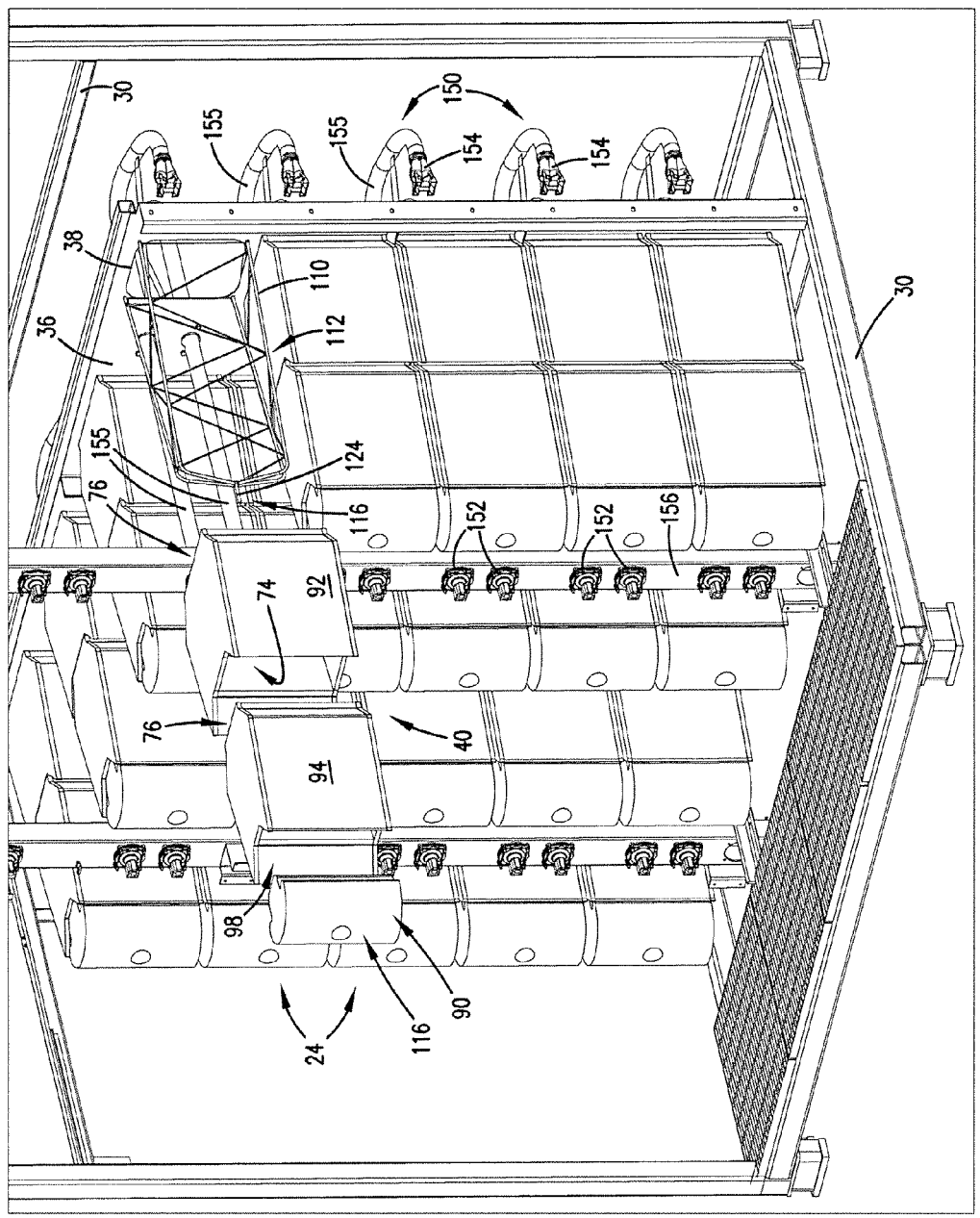
FIG. 3 is a perspective view of a portion of the gas air intake system represented in the schematic view of FIGS. 1 and 2.

FIG. 3 depicts a schematic, perspective, partially exploded view of a portion of the air intake system 22 of FIGS. 1 and 2. Depicted in FIG. 3 is a frame 30 that is used to support the tube sheet 36 and the gas filter arrangements 24. In reviewing FIGS. 1-3, it can be appreciated that the frame 30 can be constructed in accordance with desired design criteria. The frame 30 typically will include a number of cross members and supporting beams and other structural components.

Still in reference to FIG. 3, the frame 30 supports the tube sheet 36. The tube sheet 36 defines a plurality of apertures or through holes 38. Mounted in the tube sheets 36 and in air flow communication with the apertures 38 are a plurality of gas filter arrangements 24.

In the embodiment shown, each of the gas filter arrangements 24 includes at least one filter element 40 positioned to purify gas before it is used by downstream components, such as the generator 28. Certain preferred gas filter arrangements 24 configured in example arrangements are described in further detail below.

In general, air to be purified flows from the atmosphere and through the filter element 40. The filter element 40 is positioned in air flow communication with the tube sheet 36. The purified gas will flow through the aperture 38 and then into systems for use, such as the generator 28.

After a period of use, the pressure drop across the filter element 40 will increase due to the collection of impurities in the gas stream. The filter elements 40 are periodically cleaned by directing a flow of a higher pressure fluid (such as a pulse of compressed gas) into the filter element 40 in a direction from the downstream side of the filter element to the upstream side of the filter element 40. This will remove at least some of the contaminant and particulate matter from the filter element 40 and reduce the restriction across the filter element 40.

C. Example Gas Filter Arrangement

Figure 4:
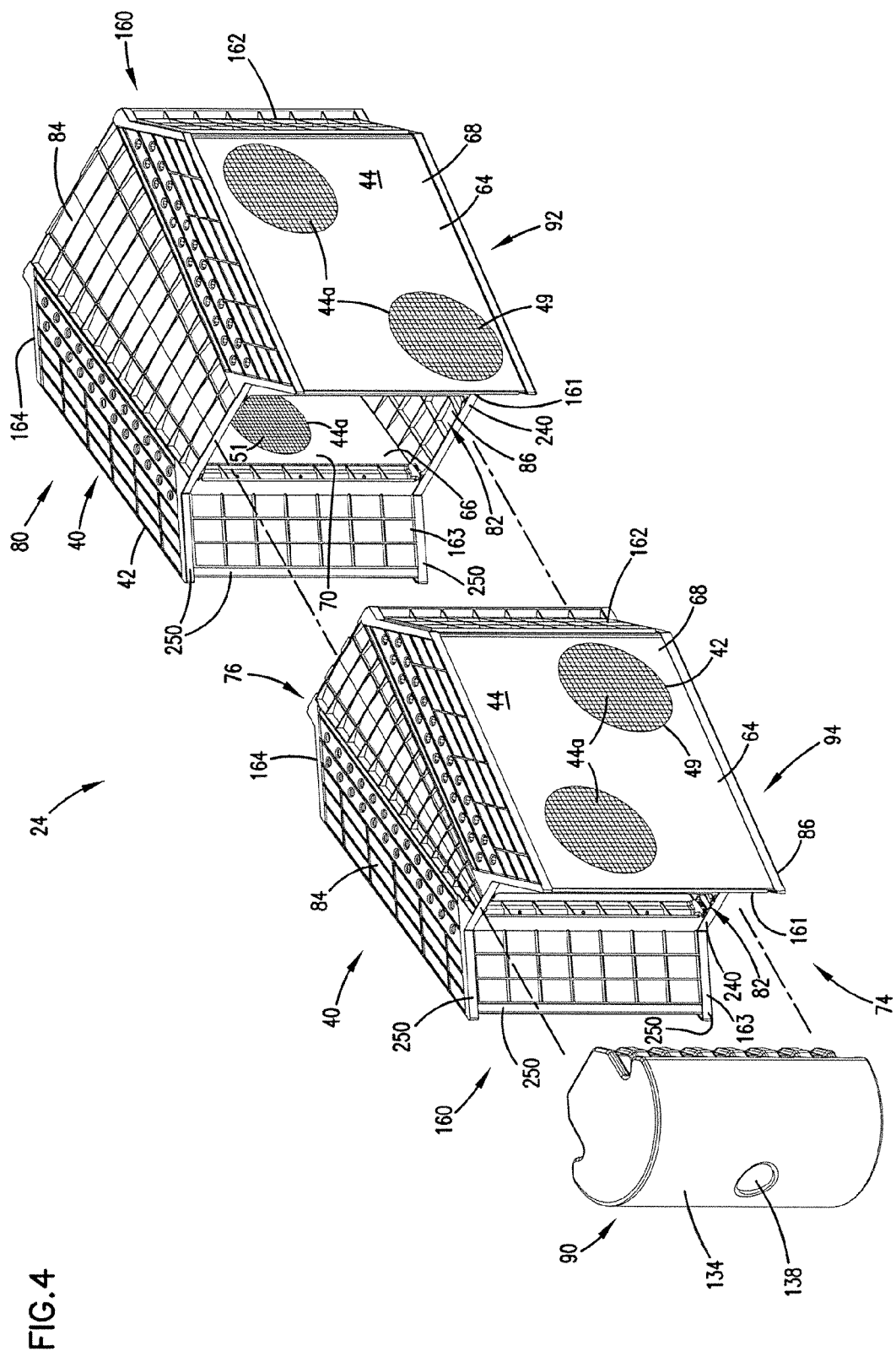
FIG. 4 is a perspective view of a pair of filter elements useable in the gas intake system depicted in FIGS. 1-3.

FIG. 4 illustrates one example embodiment of gas filter arrangement 24 useable with reverse-flow cleaning methods as described herein. The gas filter arrangement 24 includes at least one filter element 40. The filter element 40 includes at least a first filter media construction 42 made from a flexible, permeable material. The filter media construction includes Z-filter media 44. The term "Z-filter media" is meant to refer to filter media in which individual ones of corrugated, folded, or otherwise formed filter flutes are used to define sets of inlet and outlet filter flutes for fluid flow through the media. Some examples of Z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and Des. 437,401; the complete disclosures of each of these patents are incorporated by reference herein.

One particular type of Z-filter media utilizes two media components joined together to form the media construction. The two components are a flexible corrugated sheet and a flexible non-corrugated sheet. The corrugated media and non-corrugated sheet together are used to define the inlet and the outlet flutes. In some instances, the corrugated sheet and the non-corrugated sheet are secured together and then coiled to form a Z-filter media construction. Such an arrangement is described, for example, in U.S. Pat. Nos. 6,235,195 and 6,179,890, both of which are incorporated herein by reference. In certain other arrangements, some non-coiled sections of corrugated media secured to flat media are stacked on one another to create a filter construction. An example of this type of construction is described in FIG. 11 of U.S. Pat. No. 5,820,646, and in U.S. Pat. No. 5,772,883, each of which is incorporated herein by reference. In general, filter element configurations utilizing Z-filter media are sometimes referred to as "straight through flow configurations" or by variants thereof. In general, in this context, what is meant is that the filter elements generally have an inlet flow face and an opposite exit flow face, with flow entering and exiting the filter cartridge in generally the same straight through direction.

Figure 12:
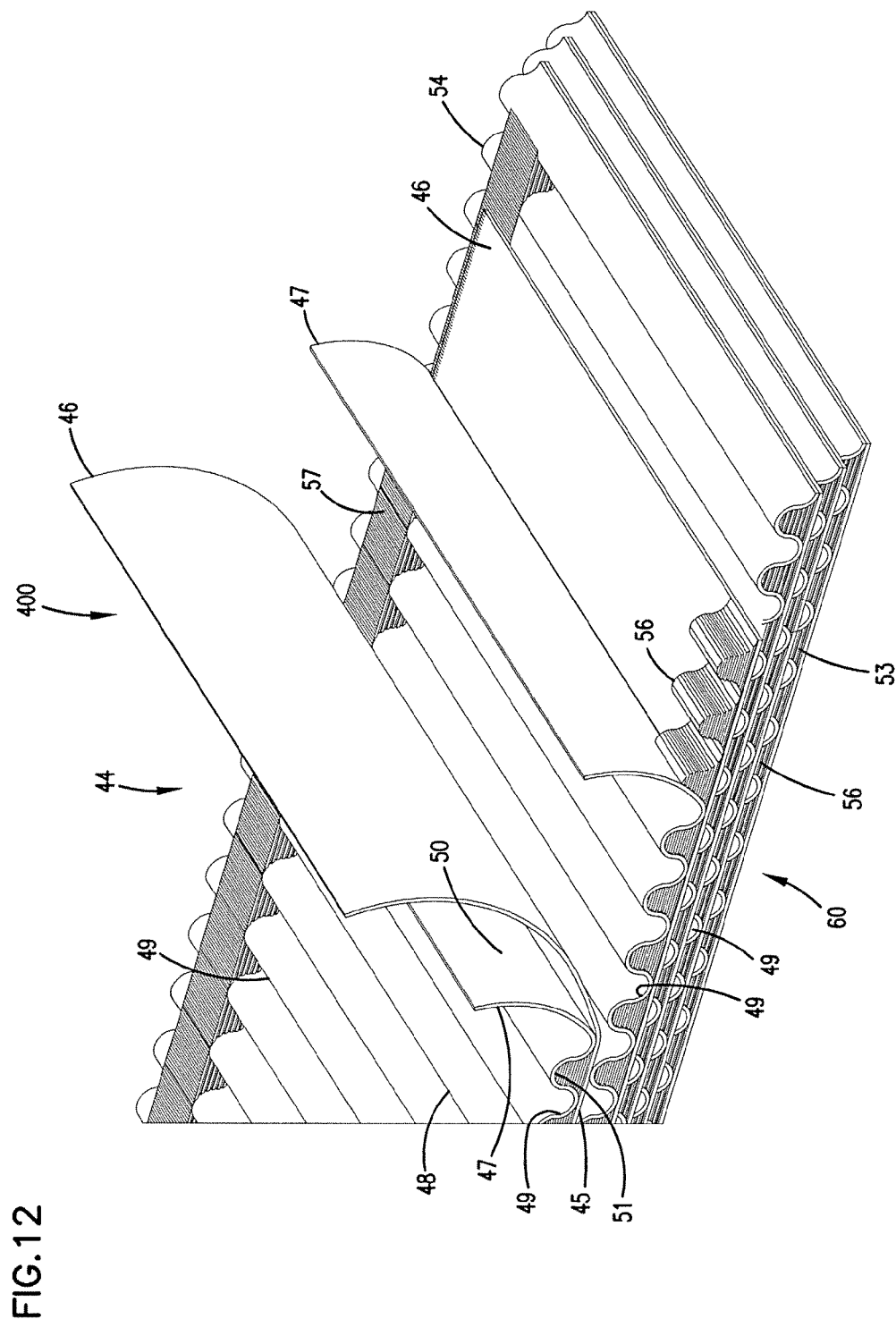
FIG. 12 is a perspective, schematic view showing a portion of filter media useable with the filter elements depicted in FIGS. 1-11.

In FIG. 12, there is a depiction of the Z-media 44 in perspective view. In FIG. 12, the Z-media 44 is a two-layered construction 45, formed from a flexible flat (non-corrugated) sheet 46 secured to a flexible corrugated sheet 47. In general, on one side 48 of the corrugated sheet 47, a first set of flutes 49 is formed; and, on an opposite second side 50, a second side of flutes 51 is formed. In FIG. 12, edge 53 would correspond to an inlet edge; and edge 54 would correspond to an outlet edge. In this context, Z-media 44 refers to media made from a flexible, permeable material. One example includes cellulose. This is in contrast to constructions made from ceramics used in, for example, exhaust systems.

The cellulose media can be treated with fine fiber, for example fibers having a size (diameter) of 5 microns or less, and in some instances, submicron. Useable fine fiber is described in commonly assigned U.S. patent application Ser. No. 09/871,583, filed May 31, 2001 incorporated by reference herein. A variety of methods can be utilized to apply the fine fiber to the media. Some such approaches are characterized in, for example, U.S. Pat. No. 5,423,829, column 32, lines 48-60, incorporated by reference herein. Further, methods are described in U.S. Pat. Nos. 3,878,014; 3,676,242; 3,841,953; and 3,849,241, each being incorporated herein by reference.

In general, the corrugated sheet 47 that is shown in the drawings is of a type generally characterized herein as having a regular, curved, wave pattern of corrugations. The term "wave pattern" in this context is meant to refer to a corrugated pattern of alternating troughs and ridges that repeat. The term "regular" in this context is meant to refer to the fact that (1) the troughs and ridges repeat with generally the same repeating corrugation shape and size; and (2) each trough is an inverse of each ridge. That is, the term "regular" is meant to indicate that the corrugation pattern comprises equal troughs and ridges and that each pair (an adjacent trough and ridge) repeats, without substantial modification in size and shape of the corrugations. The term "substantial" in this context, when referenced to the modification, refers to a modification resulting from a change in the corrugation process or form used to create the corrugation sheet, as opposed to minor variations from the fact that the material of the sheet 47 is flexible. With respect to the characterization of repeating pattern, it is not meant that in any given filter construction, there must be an equal number of ridges and troughs present. Rather, the media could be terminated, for example, between a pair comprising a ridge and a trough, or partially along a pair comprising a ridge and a trough.

In this context, the term "curved", when used with the term "regular, curved, wave pattern of corrugations", it is meant to refer to a corrugation pattern that is not the result of a folded or creased shape provided to the media. Rather, the apex of each ridge and the bottom of each trough is formed along a radiused curve. A typical radius for such media would be within the range of 0.5-10 mm.

The first set of flutes 49 is closed. In the example shown, the first set of flutes is closed with sealant adjacent the edge 54 by a sealant bead 56, or similar structure. Similarly, the second set of flutes 51 is closed. In the example shown, the second set of filters 51 is sealed adjacent to the first edge 53 by a sealant bead 57. In preferred embodiments, the sealant beads 56, 57 is either flush with (even with) its respective edge 54, 53 or even protrudes beyond the its respective edge 54, 53. Preferably, for advantageous operation of the reverse-flow cleaning system, the sealant beads 56, 57 will not be recessed or spaced from its respective edge 54, 53.

In other arrangements, the flutes may be closed at their ends using crushing, darting, or other types of deformations. An example of fluted media having deformed ends is described in commonly assigned U.S. provisional patent application 60/395009 filed Jul. 10, 2002 and PCT application US03/02799 filed Jan. 31, 2003, both of which are incorporated by reference herein. In addition, the flutes could be tapered, as described in FIG. 1 of WO 97/40918 and PCT WO 03/47722, both of which are incorporated by reference herein. Tapered flutes would be a curved wave pattern, but would not be a "regular" pattern, as that term is used herein. While the example embodiment shows the use of a sealant to close the flutes, other techniques can be used. For example, the flutes can be closed with urethane. In addition, the flutes can be closed by using ultrasonics.

The sheet of corrugated media 47 secured to the flat sheet 46 can then be arranged in a variety of fashions to form a filter element 40. One example is coiling the flat sheet 46 and corrugated sheet 47. An example of a coiled filter element formed in this way is shown in U.S. Pat. Nos. 5,820,646 and 5,895,574, incorporated herein by reference. In the particular embodiment shown in FIG. 12, the flat sheet 46 secured to the corrugated sheet 47 is stacked to form a stacked or layered construction 60. The stacked construction 60 includes a plurality of pieces of two layered constructions 45 secured to corrugated sheet 47 stacked adjacent to each other and secured together. In the embodiment shown in FIG. 12, there are 5 pieces of two layered constructions 45.

From a review of FIG. 12, it should be apparent how the Z-media 44 functions. In general, the first set of flutes 49 are open at inlet edge 53, and thus comprise inlet flutes 49. Each of the inlet flutes 49 are closed at edge 54, (their exit ends) as a result of sealant bead 57 or similar closure at this location. Thus, gas that enters flute 49 at inlet edge 53 must pass through the media 44 (either the corrugated sheet 47 or the flat sheet 46) to escape from the inlet flutes 49. Upon passage through the media, filtering occurs, and fluid flow enters a second set of flutes 51 (outlet flutes), at a location downstream from the bead 56. Outlet flutes 51 are open along edge 54; thus, the filtered gas stream can flow out of the media 44. This type of construction is generally characterized herein as Z-filter media.

Figure 13:
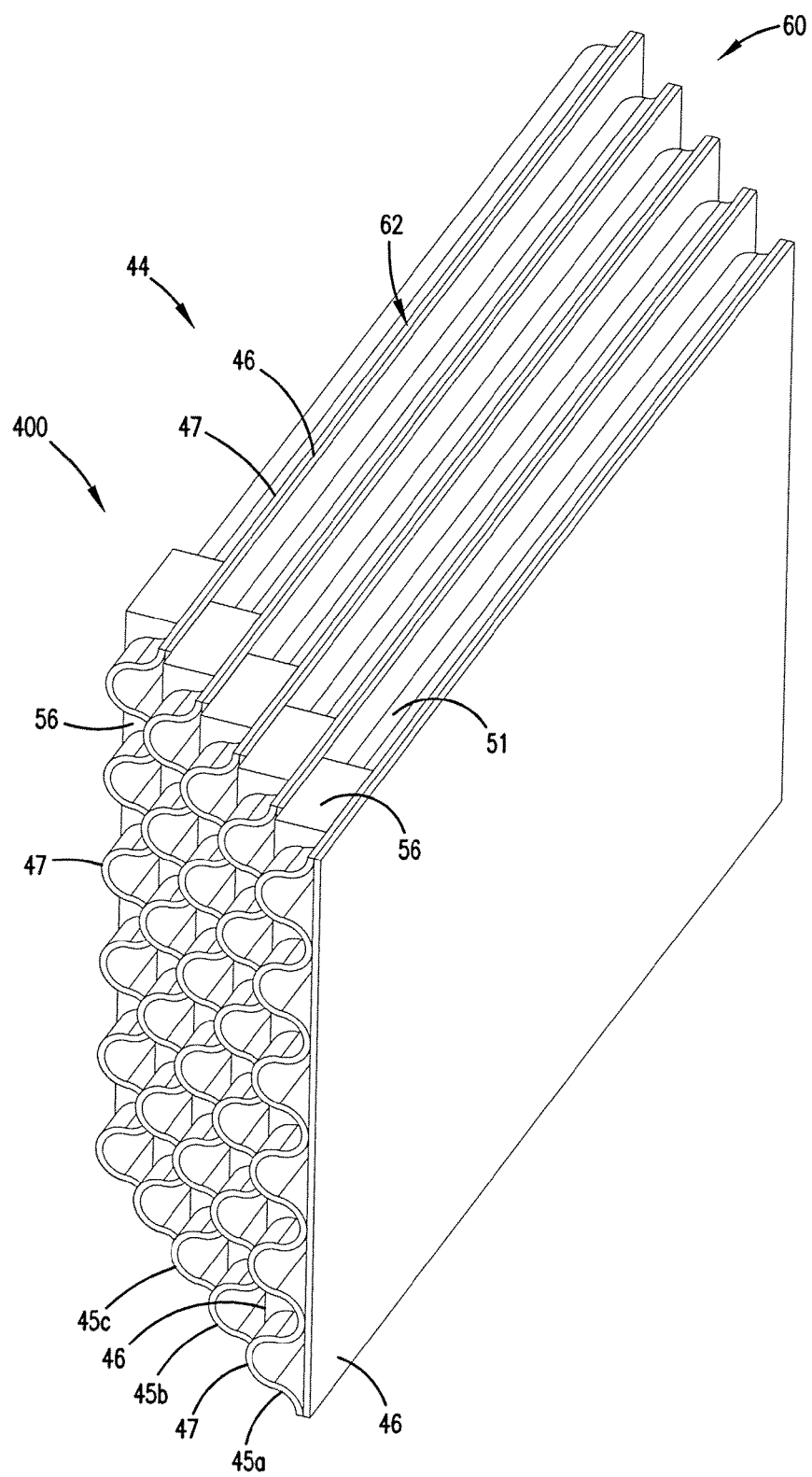
FIG. 13 is a perspective, schematic view of the filter media of FIG. 12 arranged in a stacked configuration that is useable for the filter elements depicted in FIGS. 1-11.

In FIG. 13 is another view of the Z-media 44 arranged in the stacked construction 60. Each of the two layered constructions 45 is secured to its next adjacent sheet. In the example illustrated, the layered constructions 45 are secured together by way of one of the sealant beads 56 or 57. In the example shown in FIG. 13, the bead 56 is shown. In FIG. 13, the edges of the flutes 51 can be seen. As will be described further below, in preferred arrangements, the stacked construction 60 is secured to and sealed within an end cap, which provides a gas-tight closure to the side 62 of the stacked construction 60.

Attention is again directed to FIG. 4. In preferred embodiments, the filter element 40 will include a pair of media constructions 42, depicted as a first media construction 64 and a second media construction 66. In the arrangement shown, each of the first and second media constructions 64, 66 is constructed from Z-media 44. In the specific example embodiment shown, the first and second media constructions 64, 66 are stacked constructions 60 of Z-media 44.

Each of the first and second media constructions 64, 66 has inlet flutes 49 forming an upstream flow face 68 and outlet flutes 51 forming downstream flow face 70. FIG. 4 depicts the Z-media constructions 64, 66 schematically. As such, only small sections 44a of the media is shown. It should be understood that the entire upstream face 68 and downstream face 70 are constructed of Z-media 44.

Figure 15:
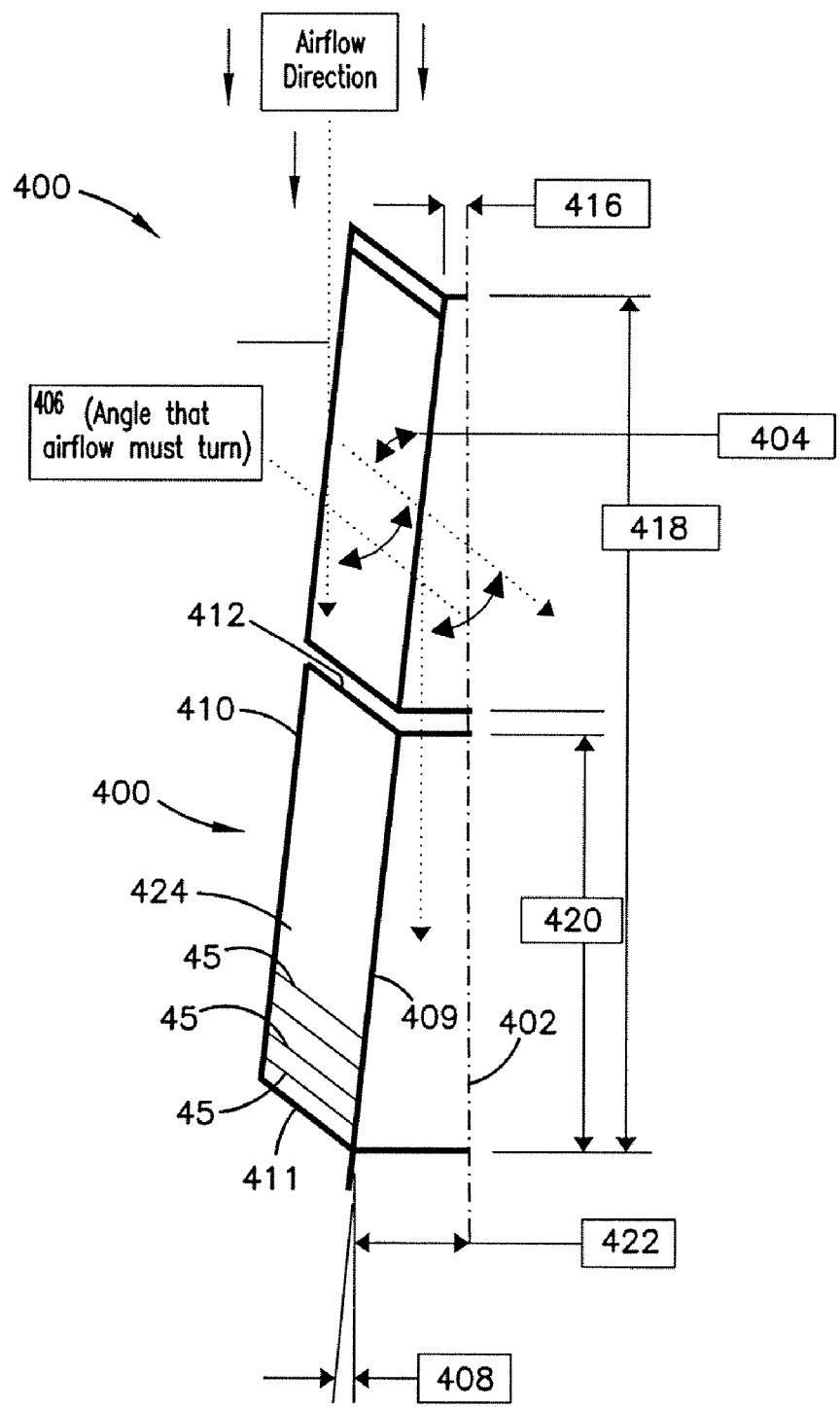
FIG. 15 is a diagram showing one example embodiment of a layout of the media packs with respect to directions of gas flow.

Attention is directed to FIGS. 12, 13, and 15. In the preferred embodiment, each of the layered constructions 45 is secured to its adjacent layered construction 45 spaced not flush with the ends, but offset, to create a slanted block 400 of flutes 51. FIG. 12 shows each layered construction 45 spaced unevenly with its next adjacent layered construction 45, with the layered construction 45 on the top of the slanted block 400 being the one most projecting from the page, while the bottom layered construction 45 is the one most recessed into the page. FIG. 13 shows layered construction 45a relative to layered construction 45b. Layered construction 45b is recessed away from layered construction 45a. Layered construction 45c is recessed relative to layered construction 45b. This pattern is continued. The result of this pattern is the slanted block 400. If each layered construction 45 were even with its next adjacent layered construction 45, each of the flute ends would be flush and even with each other. In the particular example shown, each layered construction 45 is parallel to all other layered constructions 45.

In the example illustrated, each layered construction 45 is oriented at an angle relative to a vertical axis 402 (FIG. 15). Axis 402 is the centerline that bisects the V-configuration 72. Axis 402 is also the line that is generally orthogonal to the tube sheet 36. The angle of each layered construction 45 relative to the axis 402 is shown at 404 in FIG. 15. The angle 404 is at least 10°, less than 90°, and preferably 40°-50°.

Still in reference to FIG. 15, the slanted block 400 results in less turbulence because of a smaller angle that the air flow must pass. Reference numeral 406 illustrates the angle that the air flow must turn through the slanted block 400. This angle 406 will depend upon the angles 404 of the layered constructions 45 relative to the center line 402 as well as the angle 408. The angle 408 is the angle of the downstream flow face 409 relative to the center line 402. Preferably, the angle 408 is equal to or less than the angle of the flutes 406. In the embodiment shown, the angle 408 is 45° or less, preferably 20° or less, and typically 3°-7°. In the embodiment shown, angle 406 is less than 80°, typically 30°-70°, and in the one shown is 40°. The air flow turns the angle 406 to pass through the media and then turns another angle to pass through the clean air side through the tube sheet. This angle that the air flow turns again is roughly the same as angle 406, in this instance, less than 80°, preferably 30°-70°, and for example about 40°. When pulsing, the air pulses flow the same angles, only in an opposite direction. Thus, the pulse jets first flow parallel to the center line 402, then turn at angle 406 to pass through the media. Thus, the pulse jets turn at an angle of less than 80°, typically 30°-70°, and for example 40°.

Still in reference to FIG. 15, it can be seen how in the preferred embodiment, the slanted block includes upstream flow face 410, downstream flow face 409, and end surfaces 411, 412. In the embodiment shown, the slanted block 400 forms a parallelogram and is non-rectangular. Specifically, end surfaces 411 and 412 are parallel to each other, while upstream surface 410 is parallel to downstream surface 409. However, the angle between the end surfaces 411, 412 are not at 90° relative to the upstream flow face 410 and downstream flow face 409.

Still in reference to FIG. 15, an example embodiment with dimensions is illustrated. In FIG. 15, the distance between the center line 402 and the down stream face 409 of the media pack nearest the vertex is shown at 416. This dimension, in the example shown, is less than 10 in., preferably less than 5 in., and typically 2 in.-3 in. The overall length of the downstream flow faces 409 as projected onto the center line 402 is shown at dimension 418. This length 418 is less than 100 in., greater than 10 in., and typically 40 in.-50 in. The length of the downstream flow face 409 of the media pack 424 nearest the tube sheet as projected onto the center line 402 is shown at dimension 420. Dimension 420 is less than 70 in., greater than 5 in., and typically 15 in.-30 in. The distance between the center line 402 and the downstream flow face 409 that is immediately adjacent to the tube sheet is shown at dimension 422. Dimension 422 is less than 25 in., greater than 1 in., and typically 3 in.-10 in.

Figure 7:
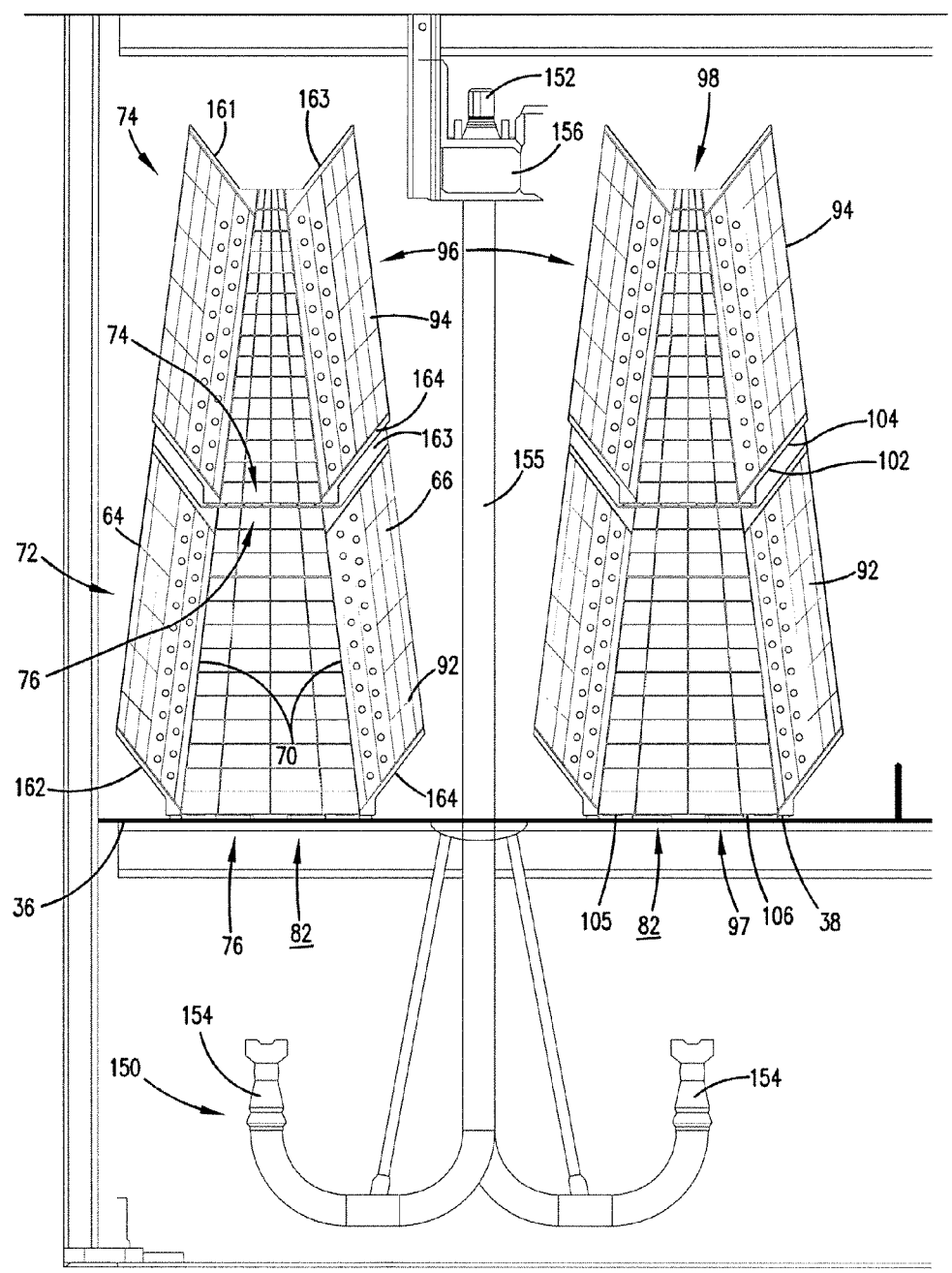
FIG. 7 is an enlarged view of a portion of the cross-section depicted in FIG. 5.

In reference now to FIG. 7, in the example configuration shown, the first media construction 64 and the second media construction 66 are arranged relative to each other such that the downstream flow face 70 of the first media construction 64 is directed towards or is facing the downstream face 70 of the second media construction 66. This can be seen in FIG. 7. In preferred embodiments, the first media construction 64 and the second media construction 66 are angled relative to each other to form a V-configuration 72. The V-configuration includes an apex 74 and a mouth 76. In the particular embodiment shown, the apex 74 does not come to a precise point between the first and second media constructions 64, 66. Rather, it is the region where the first and second media constructions 64, 66 are most closely positioned relative to each other. The mouth 76 is the region where the first and second media constructions 64, 66 are spaced furthest apart from each other.

Still in reference to FIG. 4, in preferred embodiments, the filter element 40 includes an end panel arrangement 160. The end panel arrangement 160 functions to help support the media construction 42 and to resist forces from loads of pressure (either vacuum or pulsing). The end panel arrangement 160 also helps to support and hold a gasket, described in further detail below. As embodied herein, the end panel arrangement 160 includes an end panel 161, 162, 163, and 164 on the first and second media constructions 64, 66, respectively. In particular, the first media construction 64 includes end panel 161, 162, while the second media construction includes end panel 163, 164. It can be seen that these end panels 161, 162, 163, 164 are located at the end points of the media constructions 42. In the illustrated embodiment, these end panels 161, 162, 163, 164 are attached to and sealed against the ends of the media construction 42 and provide protection to the media construction 42.

Figure 6:
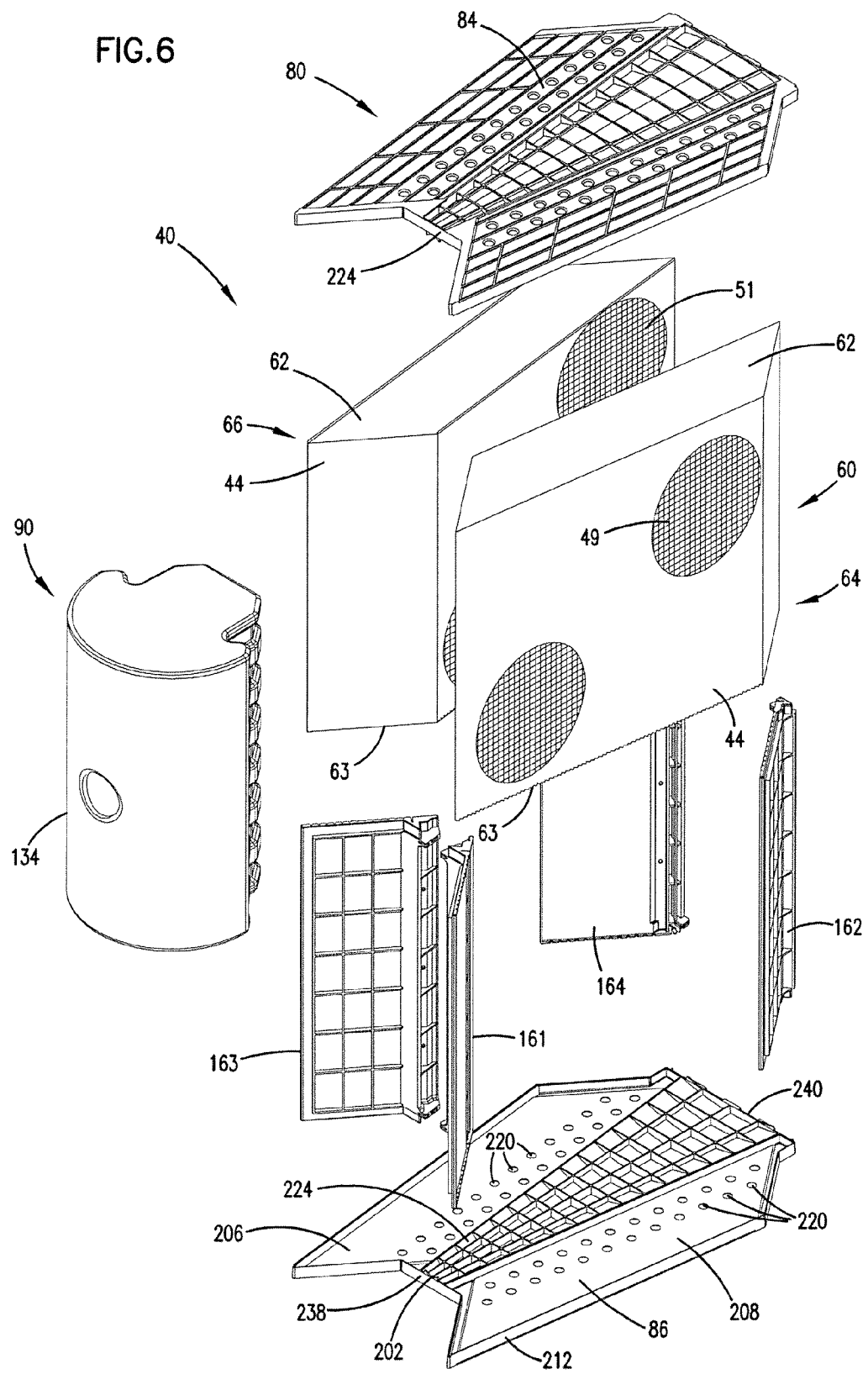
FIG. 6 is an exploded, perspective view of one of the filter elements depicted in FIG. 4.

In preferred embodiments, the filter element 40 will also include an end cap arrangement 80. The end cap arrangement 80 will function to secure sides 62, 63 (FIG. 6) of the first and second media constructions 64, 66. That is, the end cap arrangement 80 helps to prevent gas flow from bypassing the filter element 40 and proceeding directly into a clean air plenum 82. While a variety of configurations are useful, in the example embodiment shown, the end cap arrangement 80 includes a first end cap 84 and a second end cap 86. The first and second end caps 84, 86 also help to secure together the first media construction 64 and the second media construction 66.

In particular, the first end cap 84 is secured to the side 62 of both of the first media construction 64 and the second media construction 66. The second end cap 86 is secured to both of the sides 63 of the first media construction 64 and second media construction 66. The end caps 84, 86 secure the media constructions 64, 66 together and help them to hold their V-configuration 72. Together with an end construction 90, the first and second end caps 84, 86 define the clean air plenum 82. In the illustrated embodiment, the end caps 84, 86 can be secured to the media constructions 64, 66 with adhesive, polyurethane, or other suitable materials. Preferably, the end panels 161, 162, 163, 164 are first secured to the first and second media constructions 64, 66 followed by securing the end caps 84, 86.

In certain preferred systems, the gas filter arrangement 40 will include two filter elements 40, depicted as element 92 and element 94. Elements 92 and 94 are configured to mate together to form an overall V-pack 96 (FIG. 7) having a mouth 97 and an apex 98. Element 92, in the configuration shown, will typically be the element nearest the tube sheet 36 and sealed with a gasket 105 (FIG. 5) against the aperture 38 forming a seal 106. The apex 74 of the element 92 will be in sealing engagement with the mouth 76 of the element 94. In this manner, it can be appreciated that the general width of the element 92 is greater than the width of the element 94. This can be seen in FIG. 7. In the preferred configuration shown, the elements 92, 94 are mounted onto the frame 30 and sealed together in a way such that they nest with each other. As mentioned above, the mouth 76 of the element 94 is received by and nests with the apex 74 of the element 92. Typically, a gasket 102 (FIG. 5) is used to form a seal 104 between the filter element pair 92, 94. The gasket 102 is held by the end panels 161, 162, 163, 164 and the end caps 84, 86.

Figure 8:
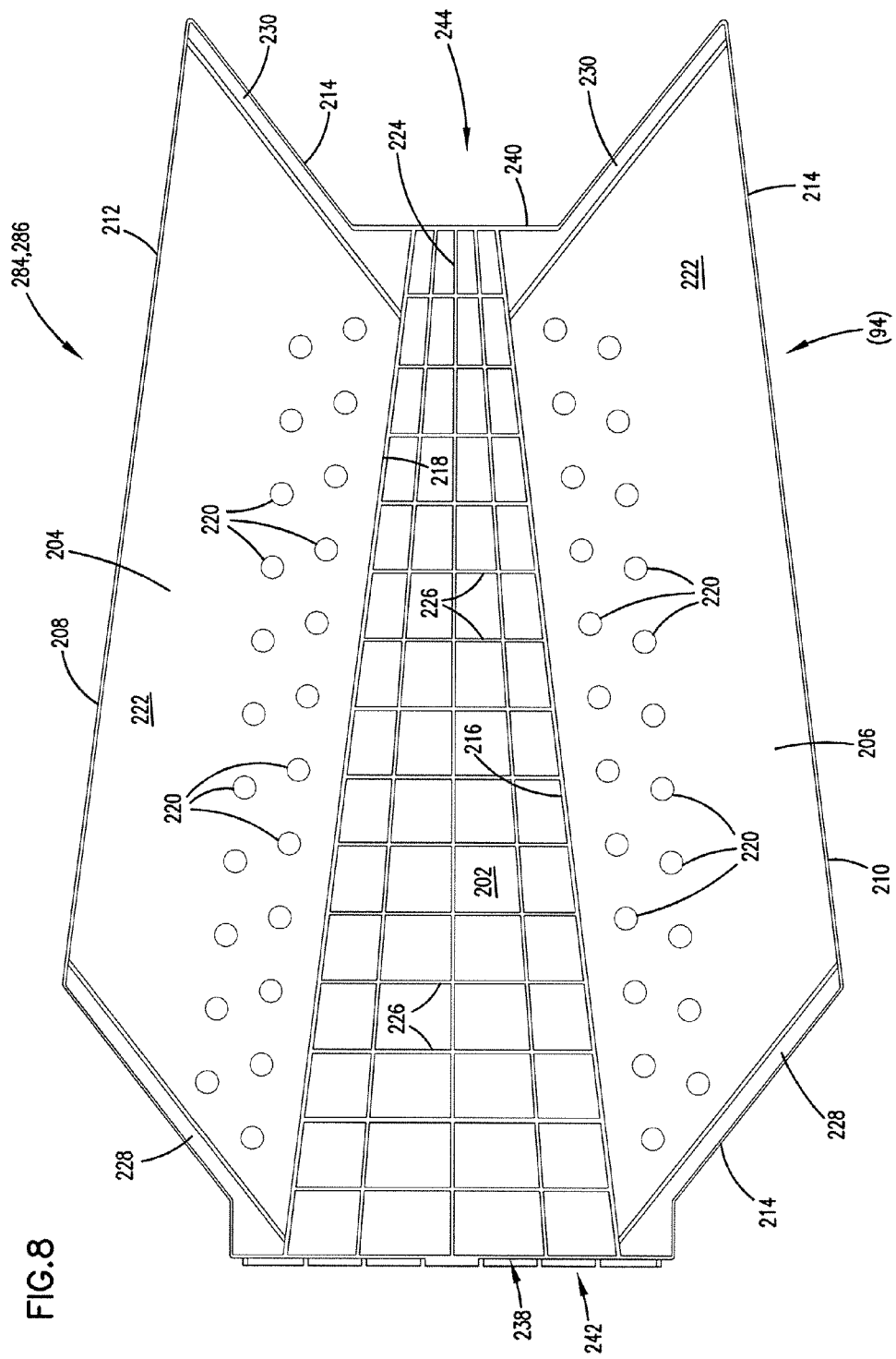
FIG. 8 is a top plan view of an end cap of one of the filter elements depicted in FIG. 4.
Figure 9:
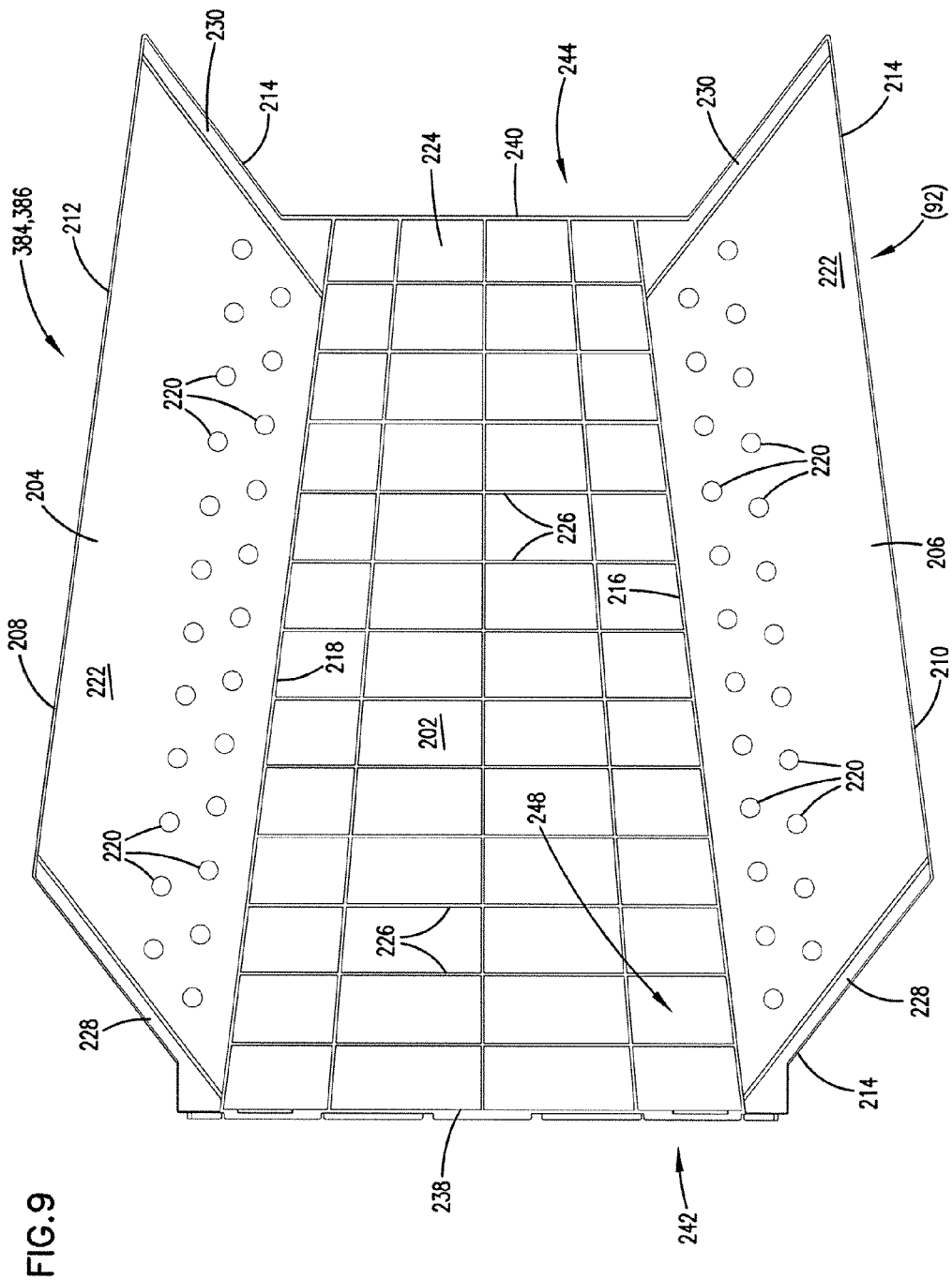
FIG. 9 is a top plan view of another end cap of the other of the filter elements depicted in FIG. 4.

As can be understood, in assembly of the V-pack 96, the first and second end caps for each of the elements 92, 94 are generally similar in construction. That is, the first end cap 84 of element 92 is similar to the second end cap 86 of element 92; and likewise for the first and second end caps of element 94. However, because of the nested features and the differing widths of the elements 92, 94, the first end cap of element 92 is different than the first end cap of element 94; and likewise for the second end caps of elements 92, 94. FIG. 8 illustrates an embodiment of the end caps (more specifically referenced as 284, 286) of element 94; and FIG. 9 illustrates an embodiment of the end caps (more specifically referenced as 384, 386) for element 92. Each of the end caps for each element 92, 94 have some similar constructions which will be denoted hereinafter with the same reference numbers for purposes of clarity.

Specific, example embodiments of assembly of the element 92, 94 are now discussed. It should be understood that a variety of ways of assembling elements 92, 94 are contemplated. The illustrated ones are examples of many possibilities. As shown, each of the end caps has a central region 202, and first and second tray regions 204, 206. In the illustrated embodiment, the central region 202 generally has a trapezoid shape that defines the shape of the clean air plenum 82 of the V-pack 96. The central region 202 can be constructed with a curved section 224. The curved section 224 is concave in relation to the clean air plenum 82 when assembled (see FIG. 6 for example). The curved section provides structural stability similar to stability provided by columnar supports, for example, that support compressive forces during gasket loading or assembly. In addition, the curved structure aids in resisting pressure loads experienced during operation of the system. The center region in the illustrated embodiment includes ribs 226 that extend between inner walls 216, 218. The ribs provide additional structure stability to the end caps 284, 286, 384, 386.

Still referring to FIGS. 8 and 9, the end caps 284, 286, 384, 386, include first and second recesses 228, 230 located adjacent to ends of the tray regions 204, 206. The first recesses 228 are configured to interconnect with end panels 162, 164; the second recesses are configured to interconnect with end panels 161, 163. By providing the recesses 228, 230, the end panels 161-164 are supported by the end caps. In addition, each of the recesses 228, 230 assists in properly locating the end panels 161-164 in relation to the media constructions 64, 66 and the end caps.

Figure 14:
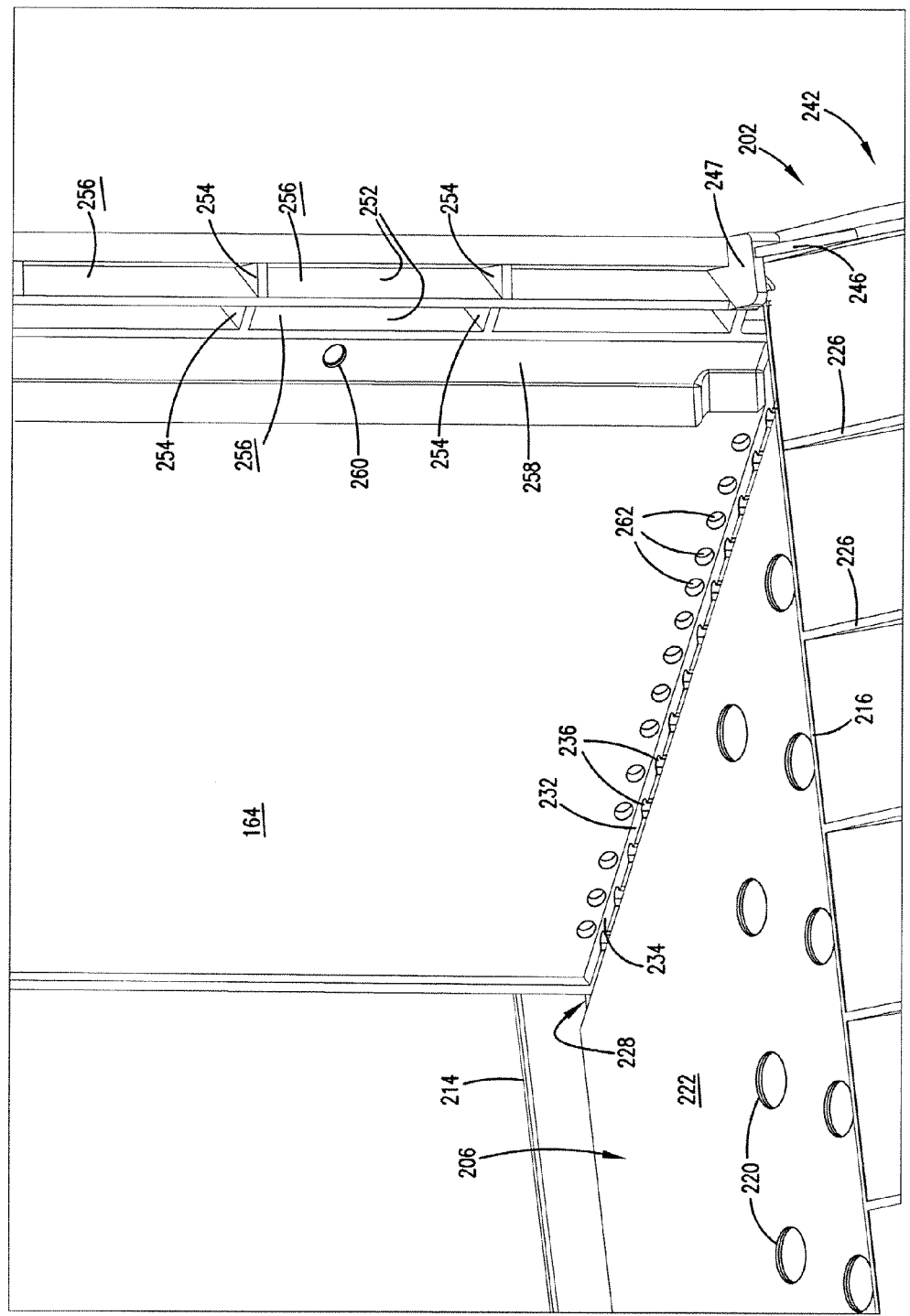
FIG. 14 is a perspective view of a portion of the filter element depicted in FIGS. 4 and 9.

Referring now to FIG. 14, one representative end panel (i.e. 164) is shown interconnected to the first recess 228 of an end cap. In FIG. 14, the end panel 164 is illustrated from a view represented by arrow 248 in FIG. 9. Although only one representative end panel is hereinafter described, the principles disclosed apply to the other end panels and end caps.

Typically, the recess 228 is sized and configured to correspond to the shape of the end panel 164. The end panel 164 includes a rib 232 that fits within the recess 228 such that an upper surface 234 of the rib 232 is flush with a planar tray surface 222 of the tray region 206. The rib 232 in essence interlocks with the recess 228 for structural stability.

In addition, adhesive or urethane also assists in securely positioning the end panel 164 in relation to the end cap.

Openings or slots 236 are formed in the rib 232 of the end panel 164. Holes 262 are also formed adjacent to the rib 232. The openings 236 and holes 262 permit adhesive or urethane contained within the tray region 206 to flow through the openings or holes 236, 262, into the recess 228, and around the rib 232. Typically, the holes 262 are located such that the top of the holes 262 are at a level generally equal to the surface level of the adhesive or urethane, which is pour into the tray region 204, 206.

The first and second tray regions 204, 206 of the end caps (284, 286, 384, 386) extend along sides 208, 210 of the end caps from a first end 242 of the end cap to a second end 244 of the end cap. The tray regions 204, 206 generally have a parallelogram shape and extend along the sides 208, 210 at an angle. The angle defines the V-shaped of the V-pack 96 when assembled to the first media construction 64 and a second media construction 66. An outer wall 212 (also shown in FIG. 6) extends along a majority of the perimeter 214 of the end cap. The outer wall 212, in combination with the inner walls 216, 218, define the tray regions 204, 206. The construction of the walls 212, 216, 218 provides structural stability to the end caps.

During assembly, the media constructions 64, 66 are positioned within the tray regions 204, 206. The walls 212, 216, 218 assist in proper placement and orientation of the media constructions 64, 66. Further the media constructions 64, 66 can be adhered to the first and second end caps. The walls 212, 216, 218 also function to contain an adhesive or urethane within the tray regions 204, 206 for adhesion of the media constructions 64, 66 to the end caps. The tray regions 204, 206 may include a plurality of holes 220 formed in a planar surface 222 of the tray region 204, 206. Overage of adhesive or urethane may flow through the holes 220 when the media constructions are assembled to the end caps.

Once the adhesive or urethane has cured, overage which has cured in the holes 220 functions as mechanical fasteners. The cured overage assists in fastening the media construction 64, 66 to the end caps in addition to the adhesive bond between the planar tray surface 222 and the media constructions 64, 66. That is, the cured overage bonds to the media construction and acts as an interconnection within the holes 220 of the tray region. The interconnection does not extend or project from any surfaces of the tray regions 204, 206. Rather, the cured overage resides within the holes 220 formed in the planar tray surfaces 222, which provides advantages in stacked filter arrangements. In some applications, it is desirable to provide holes or openings of different shapes, or position the holes or openings in an alternative arrangement to accommodate different structural loads.

Referring back to FIG. 14, the end panels (e.g. 164) each include side grooves 252. The side grooves are sized and constructed to interconnect to the media constructions 64, 66. In the illustrated embodiment, the grooves 252 are columnar shaped to provide structural stability under operational and installation loads. The side grooves include ribs 254 that define a pocket 256 for containing an amount of adhesive or urethane used to adhere the media construction to the end panel. Without the ribs 254, the adhesive or urethane would flow to the bottom of the side groove 252 and not be evenly applied to the media construction.

A non-ribbed groove 258 extends along the side grooves 252. The non-ribbed groove is also configured to receive adhesive or urethane. Holes 260 (one shown) are formed in the groove 258. Overage of adhesive or urethane may flow through the holes 260 when the media constructions are assembled to the end panels. Similar to the interconnects previously discussed with regards to the holes 220 in the tray regions 204, 206, the holes 260 of the end panels 161-164 act as interconnections. That is, once the adhesive or urethane has cured, overage that has cured in the holes 260 functions as a mechanical fastener.

Figure 5:
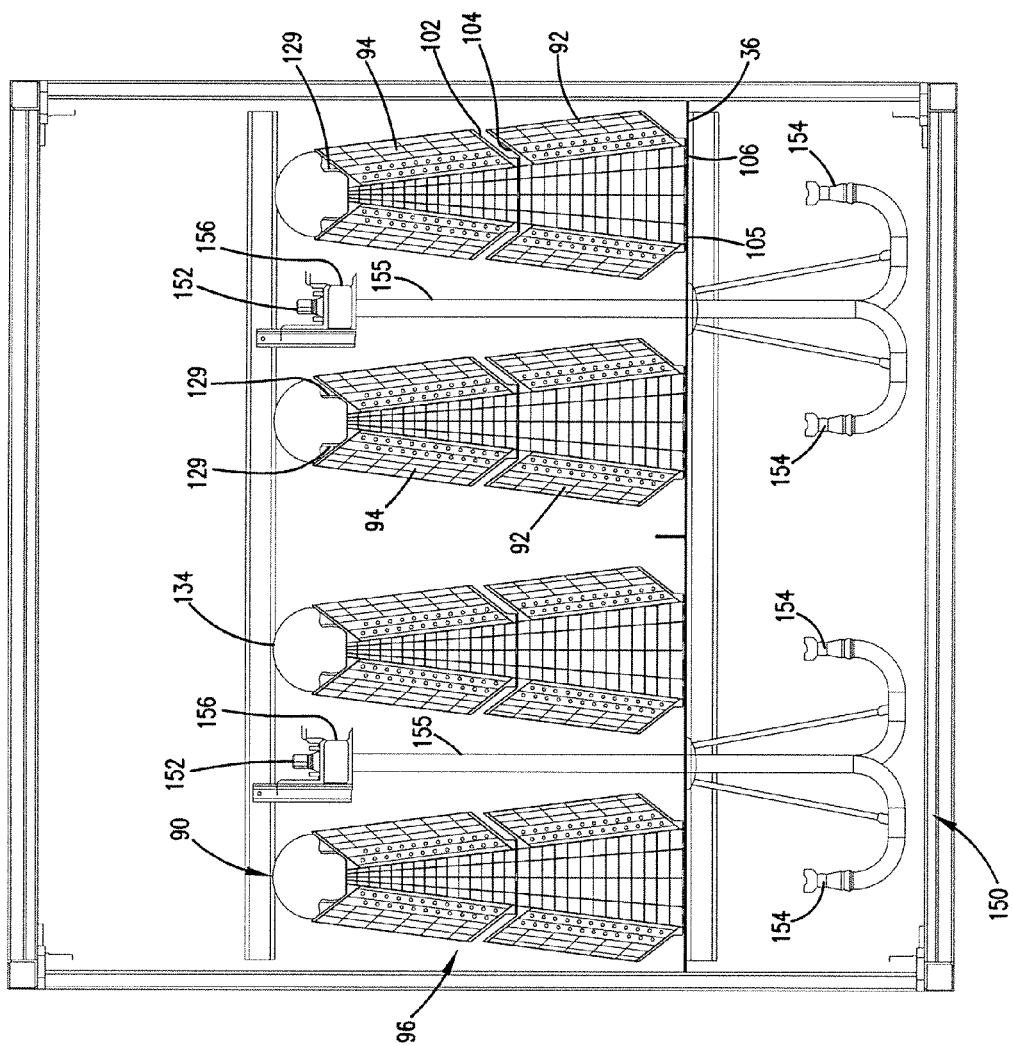
FIG. 5 is a schematic, cross-sectional view of the gas intake system, the cross-section being taken along the line 5-5 of the schematic view of FIG. 2.

Referring again to FIGS. 8 and 9, the outer wall 212 of the end caps also defines a first planar gasket sealing surface 238 located adjacent to the first end 242 of the end cap 284, 286 and a second planar gasket sealing surface 240 located adjacent to the second end 244 of the end cap 384, 386 (see also FIG. 5). For element 92, the first planar gasket sealing surface 238 of the end cap 384, 386 is configured to provide a sealing surface for the gasket 105 between the element 92 and the aperture 38 of the tube sheet 36 (FIG. 7). The second planar gasket sealing surface 240 of element 92 is configured to provide a sealing surface for the gasket 102 that is located between the elements 92, 94. Similarly, for element 94, the first planar gasket sealing surface 238 of the end cap 284, 286 is configured to provide a sealing surface for the gasket 102 between the elements 92, 94. The second planar gasket sealing surface 240 of element 94 is configured to provide a sealing surface between element 94 and the end construction 90. As can be understood, the end panels 161-164 also include sealing surface, shown generally at 250 in FIG. 4, that continue the sealing surface provided by the first and second gasket sealing surfaces of the end caps for each of the gaskets or other sealing components.

D. Mounting Arrangements

The filter elements 40 are useable, in the example shown, with the air intake system 22 of a gas turbine system 20. The elements 40 are mountable onto the frame 30, using a variety of mechanisms. One example mounting system is shown in FIGS. 3 and 7-11.

In FIG. 3, a mounting system in the form of a yoke is shown at 110. The yoke 110 has a series of supports that generally are in the shape of the clean air plenum 82. As such, the yoke 110 also has the shape of a V-configuration 112. Each of the yokes 110 extends from one of the apertures 38 in the tube sheet 36. Each of the elements 40 is mounted over the yoke 110 by sliding over the yoke 110 through the mouth 76. In the configuration shown in FIG. 3, the filter element 92 is mounted first over the yoke 110, such that it extends through the mouth 76, and out of the apex 74 of the element 92 and through the mouth 76 of the element 94.

Referring back to FIG. 14, yoke guides 246 are positioned adjacent to the first end 242 of the end cap. The yoke guides 246 are located at each of the inner walls 216, 218 (only one shown in FIG. 14). The yoke guides 246 are configured to guide and properly align the filter arrangement 24 on the yoke 110 (FIG. 3) during installation. In particular, the yoke guides 246 guide the yoke 110 to position and support the filter arrangement 24 at surface structures 247. The surface structures 247 are formed at opposite ends of the panel 164 adjacent to the grooves 252 (only one surface structure 247 shown).

Figure 10:
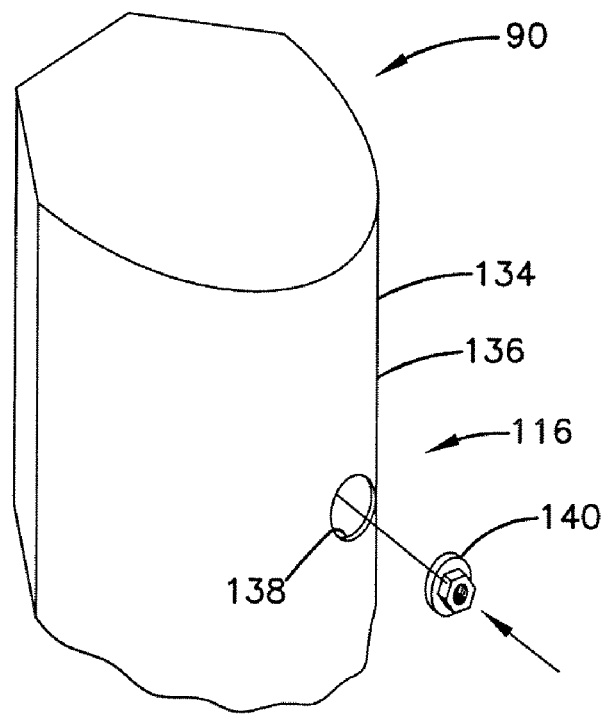
FIG. 10 is a schematic, perspective view showing a portion of the filter element useable with the system for securing the filter element onto the frame of the gas intake system.

Referring now to FIGS. 3-4 and 10-11, further details of the mounting system are shown. In FIG. 10, a connection system 116 that secures together the apex 98 of the V-pack 96 is shown. The system 116 includes the end construction 90 that closes the apex 98 and forms an end of the clean air plenum 82. In the illustrated embodiment, the system 116 includes a bolt 124 (FIG. 3) that extends from a portion of the yoke 110.

Figure 11:
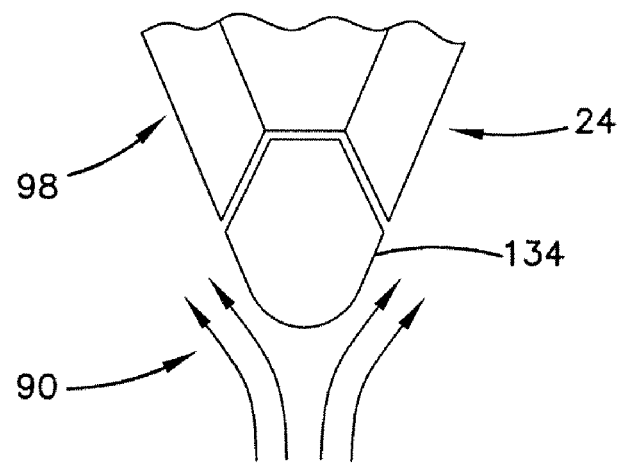
FIG. 11 is a schematic view showing gas flow with the arrangement of FIG. 10.

Referring to FIG. 10, the end construction 90 preferably has a non-porous contoured end piece 134. The end piece 134 includes contoured, rounded surface 136. The end piece 134 defines an aperture 138, through which the bolt 124 extends. The bolt 124 receives a suitable mating fastener, such as a nut 140. Upon tightening of the nut 140, the end piece 134 is compressed against the filter arrangement 24 and forms a seal 106 with the tube sheet 36. This also squeezes the filter element 92 and 94 between and against the end piece 134 to form a seal 129 (FIG. 5). FIG. 11 shows the flow of gas as it encounters the gas filter arrangement 24 including the end piece 134.

E. Reverse-Flow Cleaning System

Attention is directed to FIGS. 3, 5, and 7, from which a more detailed understanding of the reverse-flow cleaning system 150 will be understood. In general, the reverse-flow cleaning system 150 uses a flow of a higher pressure fluid, such as pulses of gas, such as air, to clean the V-packs 96. By "pulse", it is meant a flow of fluid at a pressure at least 10%, typically at least 25% higher than the flow at the inlet end, and for a limited time duration. Typically time durations are under 10 seconds, typically under 5 seconds and in some cases, less than 0.5 seconds.

In reference now to FIGS. 3 and 7, the pulse jet cleaning system 150 includes a plurality of pulse jet valves 152, each valve having an associated nozzle 154. A compressed air manifold 156 can be seen in gas flow communication with the valves 152, which directs gas through blow pipes 155 and to nozzles 154. In FIG. 5, it can be seen how the nozzles 154 are spaced a distance from the tube sheet 36. This distance is at least 8 inches, no greater than 36 inches, and typically 20-28 inches.

In general, the reverse pulse system 150 can be operated using an air compressor. Periodically, the valves 152 can be operated to allow a pulse jet of compressed gas to pass through the nozzles 154, through the apertures 38 in the tube sheet 36, and into the clean air plenum 82 of the V-pack 96. In general, the pulse jet of air is directed in a reverse direction, backwards, or as a back flush through the V-packs 96. By the term "in a reverse direction," it is meant that the pulse jet of air is directed opposite to normal gas flow, i.e., filtering air flow (during filtering of ambient air). Such a direction of gas flow will tend to flush dust or other particles collected on the V-packs 96 therefrom. The pulse jet system 150 may, in general, except for the geometric configurations described and shown herein be similar to the arrangements described in U.S. Pat. Nos. 4,331,459; 4,364,751; and 5,575, 826, incorporated herein by reference. In some preferred systems, the pulse jet system will use systems as described in commonly assigned and co-pending application Ser. No. 10/731,556, filed the same date as this application, entitled "Reverse Flow Cleaning Systems and Methods" incorporated herein by reference.

In general, it has been found that for certain particular applications, it will be beneficial to direct the pulse of compressed gas at a force of between 5-55 inches of water. This is measured at the downstream face with a face measured permeability value of 65-70.

F. Methods of Operation and Service

In general, a method using systems and configurations described herein will comprise providing a filter having a Z-media configuration 44. The filter with the Z-media configuration 44 can be cleaned by directing a flow of pressurized fluid into the media construction 42 through the downstream flow face. This will cause dust or other particulate matter to be moved away from the upstream flow face.

The step of directing a flow of pressurized fluid may include directing a pulse of compressed gas. Directing a pulse of compressed gas can include periodically directing the pulse of compressed gas into the media construction through the downstream flow face. By "periodic", it is meant that the reverse-flow cleaning system 150 can be programmed or can be manually operated such that in desired periods, after a certain length of time or after a certain amount of restriction is detected, there will be a pulse of compressed gas directed through the downstream flow face. In the configurations shown, one useful range is directing the compressed gas at a force of 5-55 inches of water.

When arranged in the configurations shown, it is useful to direct the pulse of compressed gas into the clean air plenum 82 of the V-pack 96.

The air intake system 22 can be used to clean ambient air before it is used by the gas turbine generator 28 (FIG. 1). In use, ambient air will be directed into the gas filter arrangements 24. The air will enter the upstream flow faces 68, pass through the Z-media 44, and exit through the downstream flow faces 70 into the clean air plenum 82. The cleaned air will then flow through the apertures 38 in the tube sheet 36 and then be directed into the generator 28. After a period of use or after reaching some initial restriction, the pulse jet cleaning system 150 will direct a pulse of compressed gas or air through the apertures 38, into the clean air plenum 82, through the downstream flow face 70, through the Z-media 44, and out through the upstream flow face 68. This will knock loose dust or other particulate matter from the Z-media 44. The pulse of gas will turn at angle 406 (FIG. 15) to enter the flow face 70 (shown as 409 in FIG. 15). As discussed above, the angle 406 is less than 80°, typically 30°-70°, for example 40°.

After some period of use, it will be advantageous to service the air intake system 22. Servicing will include removing the filter elements 40 and replacing them with new filter elements 40. To service the air intake system 22, the connection system 116 is manipulated to disassemble the gas filter arrangements 24. The nut 140 is removed from the bolt 124. This breaks the seal 129 between the end piece 134 and the element 94 of the V-pack 96. This also releases the seal 104 between the elements 92, 94. This also releases the seal 106 between the element 92 and the tube sheet 36. The elements 92, 94 are slid off of the yoke 110. They are then recycled or disposed of.

New filter elements 92, 94 are then supplied. New filter element 92 is first slid over the yoke 110 until the end is against the tube sheet 36. New element 94 is supplied and is slid over the yoke 110 until its mouth 76 is engaged against the apex 74 of element 92. The end construction 90 is then put into place. This is done by placing the end piece 134 into the apex 98 and then tightening the nut 140 onto the bolt 124. This will create the seal 106 between the tube sheet 36 and the element 92; the seal 104 between elements 92 and 94; and the seal 129 between the end piece 134 and the element 94. The gas filter arrangement 24 is then again useable.

What is claimed is:

1. A gas filter system comprising:
   (a) a frame having a tube sheet defining an aperture;
   (b) a first filter element mounted on the frame and sealed against the tube sheet in gas-flow communication with the aperture; the first filter element including:
      (i) at least a first media construction; the first media construction having opposite first and second ends and a plurality of flutes;
      (ii) each of the flutes having a first end portion adjacent to the first media construction first end, and a second end portion adjacent to the first media construction second end;
         (A) selected ones of the flutes being open at the first end portion and closed at the second end portion; and selected ones of the flutes being closed at the first end portion and open at the second end portion to result in an upstream flow face and a downstream flow face; and (c) a cleaning system oriented to send flow of pressurized fluid into the first media construction through the downstream flow face, and out of the first media construction through the upstream flow face.

2. A system according to claim 1 wherein:
(a) the first media construction includes:
  (i) a plurality of stacked media members; each of the media members having a corrugated sheet secured to a flat sheet.

3. A system according to claim 2 wherein:
(a) the corrugated sheet comprises a regular curved wave pattern of corrugations.

4. A system according to claim 1 wherein:
(a) the cleaning system includes at least one pulse jet valve and a compressed air manifold in gas flow communication with the valve.

5. A system according to claim 1 wherein:
(a) the cleaning system includes a plurality of pulse jet valves and a compressed air manifold in gas flow communication with the valves.

6. A system according to claim 5 wherein:
(a) each of the valves includes a nozzle.

7. A system according to claim 6 wherein:
(a) each nozzle is spaced a distance from the tube sheet no greater than 36 inches.

8. A system according to claim 6 wherein:
(a) each nozzle is spaced a distance from the tube sheet at least 8 inches.

9. A system according to claim 1 wherein:
(a) said first filter element includes the first media construction and a second media construction; the second media construction having opposite first and second ends and a plurality of flutes;
  (i) each of the second media construction flutes having a first end portion adjacent to the second media construction first end, and a second end portion adjacent to the second media construction second end;
    (A) selected ones of the second media construction flutes being open at the second media construction first end portion and closed at the second media construction second end portion; and selected ones of the flutes being closed at the second media construction first end portion and open at the second media construction second end portion to result in a second media construction upstream flow face and a second media construction downstream flow face;
(b) said first media construction and said second media construction being secured together;
  (i) said first media construction downstream flow face opposing said second media construction downstream flow face to form a clean air plenum in gas flow communication with the aperture in the tube sheet.

10. A system according to claim 9 wherein:
(a) said first filter element further includes first and second opposite end caps;
  (i) said first media construction being secured to and extending between said first and second end caps;
  (ii) said second media construction being secured to and extending between said first and second end caps; and
(b) said first media construction and said second media construction are angled relative to each other to form a V-configuration having an apex and a mouth;
  (i) said mouth being sealed against said tube sheet.

11. A method comprising:
(a) providing a media construction; the media construction being made from a flexible, permeable material and having opposite first and second ends and a plurality of flutes;
  (i) each of the flutes having a first end portion adjacent to the media construction first end, and a second end portion adjacent to the media construction second end;
    (A) selected ones of the flutes being open at the first end portion and closed at the second end portion; and selected ones of the flutes being closed at the first end portion and open at the second end portion to result in an upstream flow face and a downstream flow face;
(b) cleaning the media construction by directing a pulse of compressed gas at a force/area of 5-55 inches of water into the media construction through the downstream flow face.

12. A method according to claim 11 wherein:
(a) said step of cleaning includes removing at least some particulate material from the plurality of flutes by forcing the particulate material out of the flutes through the upstream flow face.

13. A method according to claim 11 wherein:
(a) said step of cleaning includes causing dust or other particulate matter to be moved away from the upstream flow face.

14. A method according to claim 11 wherein:
(a) said step of directing a pulse of compressed gas includes periodically directing the pulse of compressed gas.

15. A method according to claim 11 wherein:
(a) said step of providing a media construction includes providing a first filter element having a first media construction and a second media construction; the first media construction and the second media construction each having Z-media;
(i) the first media construction and second media construction being arranged in a V-shape to define a clean air plenum therebetween.

* * * * *